United States Patent [19]

Matsumoto et al.

[11] Patent Number: 4,665,740
[45] Date of Patent: May 19, 1987

[54] COMBUSTION PROCESS SENSOR

[75] Inventors: Hisashi Matsumoto, Okazaki; Yoshikazu Motogami, Kariya; Masahiko Miyahara, Chiryu; Tokuta Inoue; Kohichi Hasegawa, both of Mishima; Keiji Aoki; Shinji Ikeda, both of Susono; Mitsuo Kawai, Okazaki; Mamoru Kobashi, Aichi; Mamoru Takata; Masaomi Nagase, both of Toyota; Hiroyuki Hoshiba, Kariya, all of Japan

[73] Assignees: Nippondenso Co., Ltd., Kariya; Toyota Jidosha Kabushiki Kaisha, Toyota, both of Japan

[21] Appl. No.: 767,378

[22] Filed: Aug. 20, 1985

[30] Foreign Application Priority Data

Aug. 22, 1984 [JP] Japan ............................ 59-176925
Dec. 6, 1984 [JP] Japan ............................ 59-258193

[51] Int. Cl.⁴ .................................................. G01M 15/00
[52] U.S. Cl. .................................................... 73/116
[58] Field of Search ................ 73/116, 117.3, 119 A, 73/35; 250/227

[56] References Cited

U.S. PATENT DOCUMENTS 4,409,815 10/1983 Barkel et al. ................ 73/116 X
4,422,321 12/1983 Muller et al. ..................... 73/35
4,484,469 11/1984 Grover et al. ............... 73/117.3 X

FOREIGN PATENT DOCUMENTS 55-47428  4/1980  Japan .
57-108734 7/1982  Japan .
58-25584  2/1983  Japan .

Primary Examiner—Jerry W. Myracle
Attorney, Agent, or Firm—Cushman, Darby & Cushman

[57] ABSTRACT

A combustion process sensor for detecting combustion processes occurring in a combustion chamber of an engine has a generally tubular mounting casing to be screwed into a threaded hole in the combustion chamber wall and a quartz-glass rod axially extending in the mounting casing and held in position therein. The casing includes two axially aligned generally tubular members rigidly secured together at their own ends. The quartz-glass rod has a first portion remote from a sensing end thereof adapted to be exposed to combustion flame in the combustion chamber, and a second portion between the first portion and the sensing end. The first portion is secured to one of the two tubular members of the casing, while the second portion is supported from the casing only by a vibration damping material disposed in engagement with the outer peripheral surface of the quartz-glass rod and the inner peripheral surface of the casing.

4 Claims, 5 Drawing Figures

ABSTRACT

COMBUSTION PROCESS SENSOR

FIELD OF THE INVENTION

The present invention relates to a combustion process sensor for detecting combustion processes occurring in a combustion chamber of, for example, an internal combustion engine.

DESCRIPTION OF THE PRIOR ART

It is currently demanded to improve internal combustion engines especially for automobiles in respect of the engine output, fuel consumption rate and exhaust gas purification performance. So as to comply with the demand, it has been proposed to detect the combustion processes, such as ignition timing, in a combustion chamber of an engine by means of an ignition timing sensor which emits an output signal which in turn can be utilized to control the fuel injection timing.

Japanese Un-Examined Patent Publication No. 58-25584 laid open Feb. 15, 1983 to public inspection, which corresponds to U.S. patent application Ser. No. 286,130 filed July 23, 1981, teaches the use of a light guide element formed of optical fibers or a quartz-glass rod mounted on an engine cylinder head in a fluid-tight manner. More specifically, the light guide element is housed in a tubular casing of a heat resistant material which is screwed into a threaded hole in the cylinder head. Light generated by combustion in the combustion chamber associated with the light guide element passes therethrough to a light receiving element which is disposed adjacent to or remote from the outer end of the light guide element and operative to transduce the light to an electric signal.

Japanese Un-Examined Patent Publication No. 55-47428 laid open Apr. 3, 1980 to public inspection discloses a so-called "flame sensor" which is used to detect a flame produced in an engine combustion chamber so that the combustion processes in the combustion chamber, such as the condition of combustion of fuel therein, the temperature in the chamber, the distribution of combustion temperature therein, and so forth. Japanese Un-Examined Patent Publication No. 57-108,734 corresponding to U.S. Pat. No. 4,422,321 issued Dec. 27, 1983 discloses a light guide element formed of a quartz-glass rod disposed in light transmissive relationship to a fiber optic cable.

An example of the prior art is shown in FIG. 2. Numeral 1 designates a flame sensor, while numeral 2 designates an optical coupler operative to transduce light received from the flame sensor 1 to an electric signal. In use, the flame sensor 1 and the optical coupler 2 are secured together to form an assembly or unit. The flame sensor 1 comprises a quartz-glass rod 3 and a tubular metallic casing 5 housing the rod 3 with a layer 7 of an adhesive interposed therebetween and extending over the entire length of the quartz-glass rod 3. O-rings 6 are disposed in annular grooves formed in the outer peripheral surface of the casing 5. In a part 5a of the outer peripheral surface of the casing 5, external screw threads are formed to allow the flame sensor 1 to be fixedly mounted in a threaded sensor hole formed in the outer wall of a combustion chamber of an internal combustion engine (not shown). The optical coupler 2 has a tubular metallic casing 14 in which a photoelectric transducer (phototransistor, for example) 11 is disposed and held in place by a generally tubular plastic holder 12 and is electrically connected to an electric cable 18 fixed to the casing 14 by a cable holder 19. The electric connection between the photoelectric transducer 11 and the cable 18 is embedded in a plastic material 16 with which the tubular plastic holder 12 is filled. The O-rings 6 serve as a cushioning material when the flame sensor 1 is fitted at one end into the optical coupler 2.

The prior art has a problem that the quartz-glass rod 3 used as the light guide element and the metallic casing 5 used to mount the quartz-glass rod 3 on the combustion chamber wall have different coefficients of thermal expansion. Accordingly, because the quartz-glass rod 3 is adhesively secured to the casing over the entire length of the quartz-glass rod, tension is applied to the quartz-glass rod due to the difference in the coefficient of thermal expansion when the flame sensor is heated to a high temperature, with a resultant break down of the quartz-glass rod. The prior art has another problem that the flame sensor must be handled very carefully so as to prevent the quartz-glass rod 3 from being broken either due to a torsional stress, which would otherwise be applied to the rod 3 when the flame sensor is screwed into a threaded hole in the combustion chamber wall, or due to a bending stress which tends to be applied to the rod 3 during handling of the flame sensor 1.

In an attempt to solve the problems, it has been proposed to mount the quartz-glass rod in the metallic casing by means of a shock absorbing material or the like rather than by adhesively securing the rod to the casing. The proposed solution, however, falls short of satisfaction because the mount is not operative to keep the quartz-glass rod 3 precisely positioned relative to the outer metallic casing, so that the rod 3 is apt to be dislocated by an external shock or thermal expansion.

SUMMARY OF THE INVENTION

The present invention has its object to provide an improved combustion process sensor in which a light guide element is prevented from being damaged merely by a temperature rise in an associated combustion chamber and usual handling of the combustion flame sensor.

The combustion process sensor according to the present invention is adapted to detect combustion processes occurring in a combustion chamber defined at least partly by a wall and comprises:

an elongated, rod-like light guide element adapted to be disposed in a through-hole in the combustion chamber wall to transmit light generated by combustion in the combustion chamber, the light guide element having a sensing end adapted to be exposed to the light in the combustion chamber; and means for mounting the light guide element in the through-hole, the mounting means surrounding the light guide element and being adapted to support the light guide element in position;

wherein the light guide element is secured to the mounting means at a first portion of the light guide element remote from the sensing end, and the light guide element has a second portion extending between the first portion and the sensing end, the second portion being supported only by vibration damping means disposed in engagement with the outer peripheral surface of the light guide element and with the mounting means.

The vibration damping means may preferably include an annular elastomeric material. Because the second portion of the light guide element is supported from the mounting means solely by the vibration damping means, the light guide element is hardly damaged by the difference in the coefficient of thermal expansion. In addition, the second portion of the light guide element except for the point supported by the vibration damping means is spaced from the mounting means. The vibration damping means are effective to prevent the second portion of the light guide element from being vibrated into contact with the mounting means due to resonance to the vibration of the mounting means.

The light guide element may preferably be formed of quartz-glass but can be formed of any other materials which transmit all the visible spectra and infrared spectrum. Examples of the other materials are glasses having relatively high melting points, such as borosilicate glass and potash glass, corundum which is crystal of alumina, light-transmitting ceramics based on alumina, zirconia or thoria, and crystal of quartz. The other materials may be formed into a shape suited for mounting in the mounting means.

The mounting means may preferably be formed of a metal, but the material and the shape of the mounting means can be determined on the basis of the consideration with respect to workability, cost of manufacture, method of mounting onto combustion chamber walls, and so forth.

The annular elastomeric material may preferably be in the form of an O-ring formed of siliconcontaining rubber or other elastomeric plastics or plastic polymer. The vibration damping means may include one or a plurality of such O-rings. The number and location of such O-rings may be determined based on the consideration of the rigidity and proper vibration of the light guide element. The vibration damping means is disposed in contact with the outer peripheral surface of the light guide element and the inner surface of the mounting means. Thus, in the case where the mounting means include an O-ring or O-rings of elastomeric rubber having a good sealing characteristic, the vibration damping means also act as a fluid-tight seal against combustion gases produced in the combustion chamber.

The above and other objects, features and advantages of the invention will be made more apparent by the following description with reference to the accompanying drawings.

DESCRIPTION OF PREFERRED EMBODIMENTS

Figure 1:
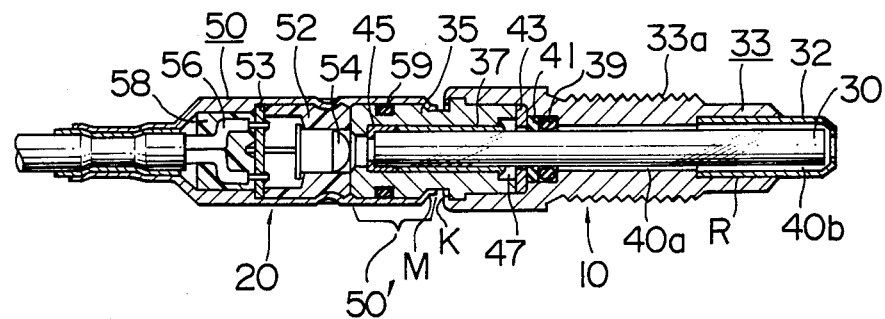
FIG. 1 is an axial sectional view of a flame sensor embodying the present invention.

A flame sensor 10 includes a light guide element formed by a quartz-glass rod 30 having one end portion covered by but spaced from a protection sleeve 32 made of a heat resistant metal, such as SUS310S which withstands a combustion temperature of about 1,000° C., and so shaped as to prevent fragments of the quartz-glass rod 30 from falling into an associated combustion chamber even in an event where such fragments are formed by an accidental breakdown of the rod. More specifically, the protection sleeve 32 has an end wall with a small opening formed therein in axially aligned relationship to the sensing end face of the quartz-glass rod 30. The other end portion of the protection sleeve 32 is fixedly fitted into one end of a tubular mounting member 33 extending around an intermediate section of the quartz-glass rod 33 in radially spaced relationship thereto to define therebetween an annular gap 40a of about 0.1 mm. A similar annular gap 40b of about 0.3 mm is also defined between the quartz-glass rod 30 and the protection sleeve 32. The other end portion of the quartz-glass rod 30 is received in a second tubular member 35 of a metal disposed in coaxial relationship to the mounting member 33. A layer 37 of an adhesive is interposed between the quartz-glass rod 30 and the second tubular member 35 to fixedly secure the rod 30 to the member 35.

As will be clearly seen in FIG. 1, the end face of the mounting member 33 remote from the sensing end face of the quartz-glass rod 30 is formed with an axially directed recess in which an adjacent end of the second tubular member 35 is snugly received with an annular space defined therebetween around the quartz-glass rod 30. An O-ring 39 of fluorine-containing rubber is disposed in the annular space and serves as a vibration-damping and pressure-sealing material. The O-ring 39 also serves to support the quartz-glass rod 30 from the tubular mounting member 33. The portion of the quartz-glass rod 30 extending from the O-ring 39 to the sensing end face of the rod 30 is spaced from the tubular mounting member 33 and from the protection sleeve 32 by the annular gaps 40a and 40b referred to above and thus is not supported by any member.

The protection sleeve 32, the tubular mounting member 33 and the second tubular member 35 cooperate together to form a mounting casing. The member 33 has an outer peripheral surface formed therein with external screw threads 33a by means of which the member 33 and thus the mounting casing can be removably secured to a threaded hole in the wall of a combustion chamber of an associated internal combustion engine (not shown). The end portion of the tubular mounting member 33 adjacent to the second tubular member 35 has integral tabs K bent or rolled over radially inwardly to rigidly connect the members 33 and 35 together. The protection sleeve 32 and the mounting member 33 are welded together as at R before the member 33 is fixedly secured to the second tubular member 35.

A first backup ring 41 of a fluorine-containing plastic copolymer is disposed to back up the O-ring 39. A second backup ring 43 of a metal is disposed between the first backup ring 41 and the second tubular member 35 to back up the first backup ring 41. A ring 45 of a packing material is interposed between the second tubular member 35 and the end extremity of the quartz-glass rod 30 remote from the sending end thereof for the purpose to be made apparent later.

The O-ring 39 of the fluorine-containing rubber has a hardness of 90° and is placed in position at a compression ratio of 20 to 30%. The first backup ring 41 is operative to back up the O-ring 39 against pressure from the combustion chamber and to reduce spaces or voids between the O-ring 39 and the first tubular mounting member 33 and the quartz-glass rod 30 to a minimum value such as 0 to 0.1 mm so that the O-ring 39 is prevented from being deformed by the combustion pressure into such voids. In the illustrated embodiment of the invention, the O-ring 39 is capable of withstanding a pressure of 150 Pa.

The second backup ring 43 backs up the first backup ring 41. The end of the second tubular member 35 adjacent to the second backup ring 41 is so shaped as to cooperate with the second backup ring 41 to define an annular space 47 which advantageously operates to prevent any excessive amount of the adhesive 37 from flowing to the O-ring 39 when the quartz-glass rod 30 is being adhesively secured to the second tubular member 35, to thereby eliminate any decrease in the pressure-withstanding ability of the O-ring 39 which decrease would be caused if the adhesive 37 is stuck to the O-ring 39.

Then, the steps of assembling the flame sensor 10 will be described hereunder. The packing ring 45 is first fitted over one end of the quartz-glass rod 30. Then, the outer peripheral surface of that section of the rod 30 which extends from the packing ring 45 toward the other end of the rod 30 a distance substantially equal to ⅓ the entire length of the rod 30 is coated with the adhesive layer 37. Then, the coated end section of the quartz-glass rod 30 is inserted into the second tubular member 35. Then, the second backup ring 43, the first backup ring 41 and the O-ring 39 are mounted on the uncoated end section of the rod 30 in the mentioned order. Thereafter, the uncoated end section of the rod 30 is inserted into the tubular mounting member 33 with the protection sleeve 32 previously welded thereto until the axial recess in the tubular mounting member 33 receives the rings 39, 41 and 43 and the adjacent end portion of the second tubular member 35. The tabs K on the tubular mounting member 33 are then bent or rolled radially inwardly over an annular shoulder on the outer peripheral surface of the second tubular member 35 to secure the two members 33 and 35 together whereby to complete a flame sensor unit which is then placed upright with the protection sleeve 32 positioned on the top. The flame sensor unit is then heated to thermally set the adhesive layer 37. Just before the adhesive 37 is thermally solidified, the viscosity of the adhesive is lowered. However, the packing material 45 is effective to prevent the viscous adhesive from flowing to the outer end face of the quartz-glass rod 30, so that this end face of the rod 30 can be kept clean. When the adhesive has been hardened, the flame sensor 10 is completed and is connected with an optical coupler 20.

The optical coupler 20 includes a coupler casing 50 in which a metallic base plate 53 and a photoelectric transducing element 54 soldered thereto are disposed and held in position by means of a generally tubular plastic holder 52 also disposed in the casing 50. In the illustrated embodiment of the invention, the photo-electric transducing element 54 comprises a phototransistor and is disposed in optical alignment with the outer end face of the quartz-glass rod 30 of the flame sensor 10 to transduce light received therefrom to an electrical signal. An electric cable 56 is electrically connected to the metallic base plate 53 to transmit the electrical signal outwardly of the casing 50. The electric cable 56 in the casing and the electrical connection thereof to the metallic base plate 53 are embedded in a plastic filing material disposed in the casing 50. The end of the casing 50 adjacent to the photo-electric transducing element 54 has a tubular extension 50' which snugly receives the adjacent end portion of the second tubular member 35 of the flame sensor 10. The endmost portion M of the extension 50' is rolled inwardly over an annular shoulder on the outer peripheral surface of the second tubular member 35 to rigidly secure the flame sensor 10 and the optical coupler 20 together. An O-ring 59 is disposed in an annular groove in the outer peripheral surface of the second tubular member 35 and serves not only as a damper operative when the flame sensor 10 and the optical coupler 20 are secured together.

It will be apparent from the foregoing description that the quartz-glass rod 30 is secured only to the second tubular member 35 remote from the sensing end of the rod 30 by means of the adhesive layer 37. The portion of the quartz-glass rod 30 between the adhesive layer 37 and the sensing end is kept out of direct contact with the tubular mounting member 33 and supported therefrom by means of the O-ring 39. Even if, therefore, the sensing end of the flame sensor 10 is subjected to a high temperature generated in an associated combustion chamber of an internal combustion engine, the second tubular member 35 is not heated to the combustion chamber temperature. Thus, the tensile stress applied to the quartz-glass rod 30 due to the thermal expansion of the second tubular member 35 is greatly smaller than that applied in the prior art. In addition, the length of the quartz-glass rod 30 to which the tensile stress is applied is only a part of the entire length of the rod 30. Thus, the quartz-glass rod 30 is not damaged by the tensile stress. In addition, because the quartz-glass rod 30 is spaced from the tubular mounting member 33 and the protection sleeve 32 by the gaps 40a and 40b, no bending or tortional stress is applied to the rod 30 even if such stress is applied to the tubular mounting member 33 when the flame sensor 10 is screwed into a threaded hole in the combustion chamber wall or when the flame sensor is handled for the purpose of transportation or the like.

The O-ring 39 is operative not only to damp vibration of the quartz-glass rod 30 caused by the cantilever-like mounting of the rod 30 but also to provide a pressure-tight seal against the combustion chamber pressure. As such, the O-ring 39 provides two functions. This is effective to simplify the structure of the flame sensor 10 and reduce the number of component parts thereof with a resultant reduction in the cost of manufacture.

Figure 2:
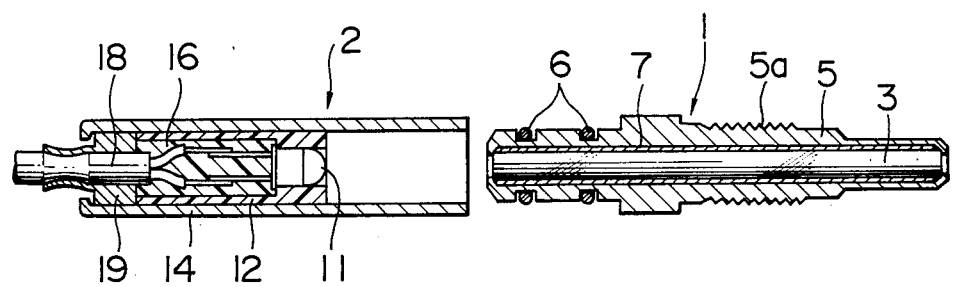
FIG. 2 is an exploded view of the prior art flame sensor discussed above.

It has been described in the above that the flame sensor 10 is rigidly secured to the optical coupler 20. However, the flame sensor 10 may alternatively be connected to the optical coupler 20 removably or detachably, as in the prior art discussed with reference to FIG. 2.

Figure 3:
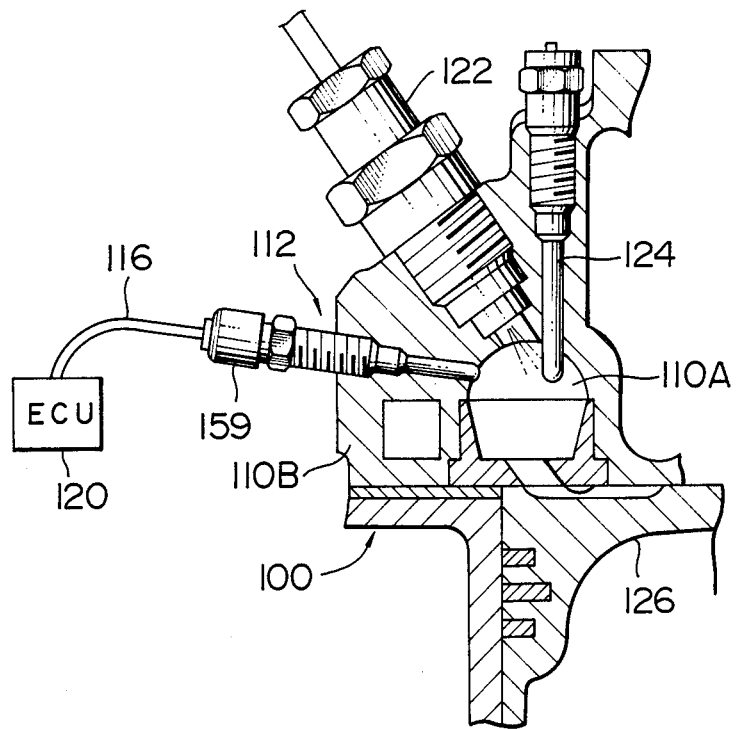
FIG. 3 is a fragmentary sectional view of a Diesel engine equipped with an ignition timing sensor of a second embodiment of the present invention.
Figure 5:
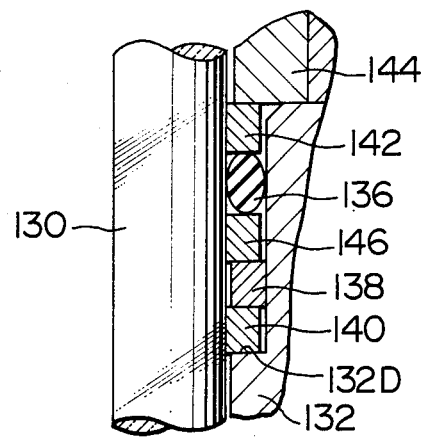
FIG. 5 is a fragmentary enlarged axial sectional view of the ignition timing sensor shown in FIG. 4.
Figure 4:
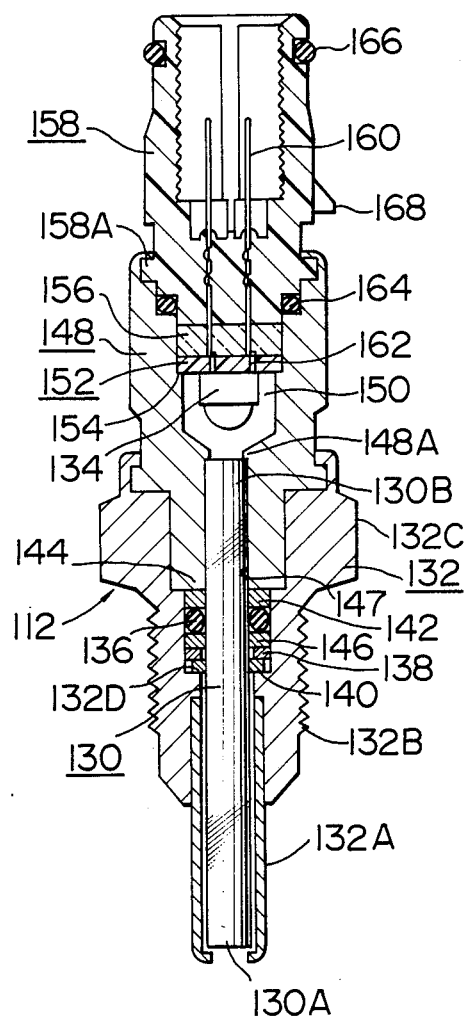
FIG. 4 is an enlarged axial sectional view of the ignition timing sensor shown in FIG. 3.

Referring to FIGS. 3–5, an ignition timing sensor 112 of a second embodiment of the invention is screwed into a threaded hole in the wall 110B of a combustion chamber 110A of a Diesel engine 100 and has a sensing end exposed to the interior of the combustion chamber to detect the light generated by the combustion therein. The other or outer end of the ignition timing sensor 112 is electrically connected through an electric cable 116 to an electronic control unit 120 (termed as "ECU") which is operative to receive an electrical output from the ignition timing sensor 112 to determine the ignition timing in the combustion chamber 110A and to emit a control signal such as an ignition timing control signal. Reference numerals 122, 124 and 126 designate a fuel injector, a glow plug and a piston of the engine 100, respectively.

The ignition timing sensor 112 will be described in more detail with reference to FIGS. 4 and 5. The ignition sensor 112 comprises a light guide rod 130 formed by a quartz-glass rod having a forward end portion 130A, a tubular mounting member 132 of a heat resistant metal or ceramics holding the light guide rod 130 therein and adapted to be sealingly mounted on the combustion chamber wall 110B (see FIG. 3), a photoelectric transducing element 134, such as a silicon phototransistor, disposed in optical alignment with the other end of the light guide rod 130 and adapted to transduce the light received from the light guide rod 130 and adapted to transduce the light received from the light guide rod 130 to an electric signal, a protection sleeve 132A welded to the inner peripheral surface of the forward end portion of an axial through-hole in the tubular mounting member 132 and extending in surrounding but spaced relationship with the forward end portion of the light guide rod 130 to protect the portion of the light guide rod extending forwardly beyond the tubular mounting member 132, and an adapter or second tubular member 148 in which an axial hole 147 is formed in axial alignment with the axial through-hole in the tubular mounting element 132.

The second tubular member 148 is snugly received at one end 144 in an axial recess formed in the adjacent end of the tubular mounting member 132 and is rigidly secured to the mounting member 132 by tabs bent radially inwardly onto an annular shoulder formed on the outer peripheral surface of the second tubular member 148. The other or rearward end portion 130B of the light guide rod 130 is received in the axial hole 147 in the second tubular member 148. An annular projection 148A is formed on the inner peripheral surface of the axial hole 147 and operative to place the light guide rod 130 in position as well as to prevent the latter from being displaced rearwardly.

The photoelectric transducing element 134 is disposed in a second axial recess 150 formed in the rear end of the second tubular member 148 and communicated with the axial hole 147. More specifically, the photoelectric transducing element 134 is supported from a base plate 152 disposed in the axial recess 150 in abutment contact with a rearwardly directed annular shoulder 154 formed on the inner peripheral surface of the recess 150. An insulator 156 is disposed in the recess 150 in engagement with the rearward side face of the base plate 152 and is urged against the base plate 152 by a connector body 158 fitted into the axial recess 150 so that the base plate is urged against the annular shoulder 154 and held in position. The connector body 158 is fixed to the second tubular member 148 by tabs which are integral with the member 148 and are bent radially inwardly over an annular flange or ridge 158A formed on the outer peripheral surface of the connector body 158. An O-ring 164 is interposed between the tubular member 148 and the connector body 158 to provide a fluid-tight seal therebetween.

The connector body 158 is adapted to be detachably connected with a second connector body 159 shown in FIG. 3. The connector body 158 carries electric terminals 160 extending through the insulator 156 and electrically connected to electrical conductors 162 extending through the base plate 152 from the photoelectric transducing element 152. When the connector body 158 is connected with the second connector body 159, the electrical terminals 160 are electrically connected to electrical terminals (not shown) carried by the second connector body 159. The connector body 158 carries thereon a second O-ring 166 which, when the connector body 158 is connected with the second connector body 159, provides a fluid-tight seal therebetween. The connector body 158 also carries thereon a lock knob 168 operative to removably secure the connector bodies 158 and 159 when they are connected together.

The tubular mounting member 130 is provided with external screw threads 132B adapted to be threadably engaged with a threaded hole in the combustion chamber wall 110B. For this purpose, the mounting member 130 is formed thereon with a hexagonal nut portion 132C.

The axial through-hole in the tubular mounting member 132 includes an enlarged or larger-diameter portion adjacent the forward end portion 144 of the second tubular member 148 to provide a rearwardly directed annular shoulder 132D, so that an annular space is defined between the tubular mounting member 132, the second tubular member 148 and the light guide rod 130. The annular space accommodates a series of rings as best shown in FIG. 5. The rings includes an O-ring 136 of fluorine-containing rubber disposed in sealing engagement with the outer peripheral surface of the light guide rod 130 and the inner peripheral surface of the tubular mounting member 132 to provide a fluid-tight seal therebetween, a first copper ring 138 disposed forwardly of the O-ring 136 and tightly engaged with the inner peripheral surface of the tubular mounting member 132, a second copper ring 138 disposed between the first copper ring 138 and the annular shoulder 132D and tightly engaged with the outer peripheral surface of the light guide element 130, a first backup ring 142 disposed between the O-ring 136 and the forward end portion 144 of the second tubular member 148 and between the tubular mounting member 132 and the light guide rod 130, and a second backup ring 146 disposed between the O-ring 136 and the first copper ring 138.

The second backup ring 146 has a width or axial dimension which fills up the axial space between the O-ring 136 and the first copper ring 138. The first and second backup rings 142 and 146 are made of a material, such as a fluorine-containing plastic polymer or sintered carbon, which does not damage the O-ring 136.

Because the second backup ring 146 has an axial dimension which fills up the axial space between the O-ring 136 and the first copper ring 138, the first and second copper rings 138 and 140 are axially positioned and axially urged so that the second copper ring 140 is urged against the annular shoulder 132D to suppress the intrusion of combustion gases from the combustion chamber into the annular space in which the rings 136–146 are disposed. The second backup ring 146 prevents the O-ring 136 from being directly engaged by the first copper ring 138, so that the O-ring 136, which is formed by a material softer than that of the copper ring 138, is prevented from being damaged.

Two copper rings 138 and 140 are provided in the illustrated embodiment of the invention, but more than three copper rings can be disposed between the second backup ring 146 and the annular shoulder 132D provided that one other copper rings are in intimate engagement with the light guide rod 130 and the inner peripheral surface of the tubular mounting member 132. In addition, the material of the rings 138 and 140 is not limited to copper and may alternatively be a soft metal.

The material of the backup rings 142 and 146 is not limited to the fluorine-containing plastic polymer or sintered carbon and may alternatively be any other material which is soft enough not to damage the O-ring 36 and capable of withstanding a temperature of from about 200° C. to about 300° C.

Moreover, the forward end portion 144 of the second tubular member 148 is not necessarily required to provide a stop or abutment for the first backup ring 142. Any other member, such as an additional ring, may be mounted to provide a stop member against the first backup ring 142.

What is claimed is:

1. A combustion process sensor for detecting combustion processes ocurring in a combustion chamber defined at least partly by a wall, said combustion process sensor comprising:

an elongated rod-like light guide element adapted to be disposed in a through-hole in said wall to transmit light generated by combustion in said combustion chamber, said light guide element having a sensing end adapted to be exposed to the light in said combustion chamber; and means for mounting said light guide element in said through-hole, said mounting means surrounding said light guide element and being adapted to support said light guide element in position;

said light guide element being secured to said mounting means at a first portion of said light guide element remote from said sensing end, and said light guide element having a second portion extending between said first portion and said sensing end, said second portion being supported only by vibration damping means disposed in engagement with the outer peripheral surface of said light guide element and with said mounting means;

said mounting means comprising a generally tubular mounting casing having an inner peripheral surface a part of which cooperates with the outer peripheral surface of said second portion of said light guide element to define a generally annular space;

said vibration damping means including an annular elastomeric material disposed in said annular space in engagement with the outer peripheral surface of said second portion of said light guide element and said part of said inner peripheral surface of said mounting casing;

said mounting casing including first and second generally tubular members secured together in substantially axially aligned relationship one to the other, said first portion of said light guide element being fixedly secured to said second tubular member, said first and second tubular members having adjacent end portions shaped to cooperate with the outer peripheral surface of said second portion of said light guide element to define said annular space;

said annular space having axial ends defined by annular faces provided by said first and second tubular members, respectively;

said annular elastomeric material being disposed adjacent to the annular face provided by said first tubular member; and said vibration damping means further including at least one backup ring disposed in said annular space in direct contact with said annular elastomeric material to back up said annular elastomeric material against pressure produced by the combustion in said combustion chamber.

2. A combustion process sensor according to claim 1, wherein said first portion of said light guide element is secured to said second tubular member by an adhesive.

3. A combustion process sensor for detecting combustion processes occurring in a combustion chamber defined at least partly by a wall, said combustion process sensor comprising:

an elongated rod-like light guide element adapted to be disposed in a through-hole in said wall to transmit light generated by combustion in said combustion chamber, said light guide element having a sensing end adapted to be exposed to the light in said combustion chamber; and means for mounting said light guide element in said through-hole, said mounting means surrounding said light guide element and being adapted to support said light guide element in position;

said light guide element being secured to said mounting means at a first portion of said light guide element remote from said sensing end, and said light guide element having a second portion extending between said first portion and said sensing end, said second portion being supported only by vibration damping means disposed in engagement with the outer peripheral surface of said light guide element and with said mounting means;

said mounting means comprising a generally tubular mounting casing having an inner peripheral surface a part of which cooperates with the outer peripheral surface of said second portion of said light guide element to define a generally annular space;

said vibration damping means including an annular elastomeric material disposed in said annular space in engagement with the outer peripheral surface of said second portion of said light guide element and said part of said inner peripheral surface of said mounting casing;

said mounting casing including first and second generally tubular members secured together in substantially axially aligned relationship one to the other, said first portion of said light guide element being fixedly secured to said second tubular member, said first and second tubular members having adjacent end portions shaped to cooperate with the outer peripheral surface of said second portion of said light guide element to define said annular space;

said annular space having axial ends defined by annular faces provided by said first and second tubular members, respectively;

said vibration damping further including at least two backup rings disposed in direct contact with said annular elastomeric material and being formed of a material which does not damage said annular elastomeric material.

4. A combustion process sensor according to claim 3, wherein one of said back up rings is disposed between said annular elastomeric material and the annular face provided by said second tubular member, and wherein said vibration damping means further include at least two additional rings disposed in said annular space between the other of said two backup rings and the annular face provided by said first tubular member, one of said additional rings being in intimate engagement with the outer peripheral surface of said second portion of said light guide element, the other of said additional rings being in intimate engagement with the inner peripheral surface of said first tubular member, said additional rings being in sealing engagement with each other.

* * * * *